United States Patent
Kamarei et al.

(10) Patent No.: US 6,859,806 B1
(45) Date of Patent: Feb. 22, 2005

(54) SYSTEM AND METHOD FOR LEGAL DOCKETING USING A CUSTOMIZABLE RULES SUBSET

(75) Inventors: Ali Kamarei, Palo Alto, CA (US); Ned Hoffman, Sebastopol, CA (US)

(73) Assignee: Ideapath Inc., Palo Alto, CA (US)

( * ) Notice: Subject to any disclaimer, the term of this patent is extended or adjusted under 35 U.S.C. 154(b) by 461 days.

(21) Appl. No.: 09/621,155

(22) Filed: Jul. 21, 2000

(51) Int. Cl.[7] ............................................. G06F 17/30

(52) U.S. Cl. ............................... 707/10; 707/1; 707/6; 709/228

(58) Field of Search .................... 707/1–10, 100–104.1, 707/200–206, 501, 513; 705/26; 709/200–201, 217–219, 228, 102–103; 715/513

(56) References Cited

U.S. PATENT DOCUMENTS

| | | | | |
|---|---|---|---|---|
| 5,099,431 A | * | 3/1992 | Natarajan | 700/105 |
| 5,329,447 A | | 7/1994 | Leedom | 705/9 |
| 5,875,431 A | | 2/1999 | Heckman | 705/7 |
| 5,895,468 A | * | 4/1999 | Whitmyer, Jr. | 707/10 |
| 6,049,801 A | | 4/2000 | Whitmyer | 707/10 |
| 6,182,078 B1 | * | 1/2001 | Whitmyer, Jr. | 707/10 |
| 6,430,581 B1 | * | 8/2002 | Mahoney et al. | 707/500 |

OTHER PUBLICATIONS

Case Management With Abacus Law+, Sep. 25, 1995, v4.

Davis, Susan– Docket Science—Computerized calendaring system reduce malpractice insurance rates. California Lawyer [online], date unknown, http://compulaw.com/articles/ART_DocketScience.htm.

* cited by examiner

*Primary Examiner*—Shahid Alam
*Assistant Examiner*—Jean Bolte Fleurantin
(74) *Attorney, Agent, or Firm*—Ali Kamarei

(57) ABSTRACT

The invention described is a computer based method for on-line legal docketing using an electronic customizable client rules subset. The method of the invention comprises of the following steps. Under control of a client system, a docket request message is sent to a host server system that is identified by a first uniform resource locator (URL), the host server system having a client case listing database containing legal case information from at least two client systems. The docket request message further comprises pattern data and a pattern data date. Under control of the host server system, it receives the docket request message, identifies the client system using a client system identifier, identifies the customizable client rules subset in a rule module database associated with the identified client system, and using the pattern data contained in the docket request message selects at least one associated action prompt from the customizable client rules subset. Once the action prompt is selected, the host server system computes an action prompt due date for each of the associated action prompts using the pattern data date and a time calculus. The action prompt and the computed action prompt due date are recorded in the client system case listing database for the legal case selected by the client system.

39 Claims, 8 Drawing Sheets

IdeaPath Case Management Systems

Main TM Screen

- New Case
- Reports
- Letters
- Forms
- Advanced Search

---

DATA TABLES

Action Due
- Attorney
- Client
- Domestic Rep.
- Foreign Counsel
- Mark Type
- Owner
- Status
- Signatories
- User Access To edit the description of the Actions listed below or to change the reminder schedule for this actions, click on them. To add a new Action, click on Add Action at the bottom of the page. To remove an Action click the check box on the right column and then click on Update.

| Actions | Action Code | Remove |
|---|---|---|
| Application Filing Post Card? | AFR | ☐ |
| Filing Receipt Received? | FLR | ☐ |
| Foreign Filing Due | FFD | ☐ |
| Status Inquiery | SI | ☐ |
| Responsed to Priority OFC | POFC | ☐ |
| Responsed to First OFC | FOFC | ☐ |
| Request for Reconsideration | RFR | ☐ |
| Appeal | APL | ☐ |
| Examiner's Ammendment | EA | ☐ |
| Statement of Use or First Extension | SOU1 | ☐ |
| Statement of Use or Second Extension | SOU2 | ☐ |
| Statement of Use or Third Extension | SOU3 | ☐ |
| Statement of Use or Fourth Extension | SOU4 | ☐ |
| Statement of Use or Fifth Extension | SOU5 | ☐ |
| Statement of Use, Final | SOUF | ☐ |
| Section 8/15 Affidavit Due | S815 | ☐ |
| Section 15 Affidavit Due | S15 | ☐ |
| Section 9/8 Affidavit Due | S98 | ☐ |
| Opposition/Conflict | OPP | ☐ |
| Power of Attorney | POA | ☐ |
| Priority Documents | PD | ☐ |

[ Add Action ] [ Update ]

FIG. 6  30

IdeaPath Case Management Systems

Main TM Screen

- New Case
- Reports
- Letters
- Forms
- Advanced Search

DATA TABLES

Action Due
- Attorney
- Client
- Domestic Rep.
- Foreign Counsel
- Mark Type
- Owner
- Status
- Signatories
- User Access Action Code: OFC
Action Name: Office Act This action is triggered from the following date:

○ Filing Date
○ Registration Date
○ Priority Date
○ Publicaton Date
○ NOA Date
○ SOU Date
○ Next Renewal
● Other/Base or Mail Date

Action Reminder Schedule ( In the +/- column if you choose "+" then the dates are calculated going forward. If you choose "-" then the dates are calculated going backward.)

| Action | +/- | DD | MM | YY | Designation | e_mail |
|---|---|---|---|---|---|---|
| OFC 2 months | + | | 02 | | Reminder | |
| OFC 3 months | + | | 03 | | Reminder | |
| OFC 4 months | + | | 04 | | Reminder | |
| OFC 5 months | + | | 05 | | Reminder | |
| OFC Final | + | | 06 | | Final | |
| OFC Final | + | 25 | 05 | | Final | ✓ |

Save

FIG. 7

| Trademark Profile | Mark: Now you know! | | | |
|---|---|---|---|---|
| | Case No.: 3017 | | Attorney 1: | Jack Olson |
| • Attorney | Case Extension: 1001 | | Attorney 2: | Brian Smith |
| • Client | Client: Brown | | Attorney 3: | None |
| • Foreign Filing | Owner: Brown | | Foreign/Other Counsel: | Haden |
| • Foreign Counsel | Country: USA | | Filing Basis: | 1(b) |
| • Domestic Rep. | Application No.: 751396218 | | Status: | Pending |
| • Goods & Services | | | | |
| • Owner | To calendar an Action click the check box on the left column. Please note that some of the Actions require a trigger date. | | | |
| • Remarks | | | | |
| • Signatories | | | | |
| • Letters | | Action | | Triggered From |
| • Forms | ⌐ | Application Filing Post Card | | Filing Date |
| • Time Keeper | ⌐ | Filing Receipt Received | | Filing Date |
| • History | ⌐ | Foreign Filing Date | | Filing Date |
| | ⌐ | Status Inquiery | | Filing Date |
| | ⌐ | Respond to Priority OFC | | Other/Base |
| | ⌐ | Respond to First OFC | | |
| | ⌐ | Request for reconsideration | | |
| | ⌐ | Appeal | | |
| | ⌐ | Examiner's Ammendment | | |
| | ⌐ | Opposition/Conflict | | |
| | ⌐ | Power of Attorney | | |
| | ⌐ | Priority Documents | | |
| | ⌐ | Statement of Use or First Extension | | NOA Date |
| | ⌐ | Statement of Use or Second Extension | | NOA Date |
| | ⌐ | Statement of Use or Third Extension | | NOA Date |
| | ⌐ | Statement of Use or Fourth Extension | | NOA Date |
| | ⌐ | State ment of Use or Fifth Extension | | NOA Date |
| | ⌐ | Statement of Use or Sixth Extension | | NOA Date |
| | ⌐ | Section 8/15 Affidavit Due | | Registration Date |
| | ⌐ | Section 15 Affidavit Due | | Registration Date |
| | ⌐ | Section 9/8 Affidavit Due | | Registration Date |

If you can't find the Action you want to calendar in the list above, then enter it below. If you wish to create an Action to be included in the list above permanently then click on ME.

| Action | Final Date | e-mail |
|---|---|---|
| | | |

FIG. 8

SYSTEM AND METHOD FOR LEGAL DOCKETING USING A CUSTOMIZABLE RULES SUBSET

FIELD

The invention relates generally to computer systems designed to execute electronic legal docketing on behalf of users. More specifically, this invention relates to real-time, on-line computer based systems, which use the Internet to enable legal docketing using a host server system.

BACKGROUND

Certain interactions with a governmental entity require that a legal proceeding be initiated before that governmental entity. Generally, whenever a legal case is created, the governmental entity issues a case number to the legal case in order for parties and the governmental entity to be able to identify that case. During the pendency of the legal case, which is generally measured from the time the legal proceeding is initiated (case filed) until when the legal proceeding is terminated, certain actions must be undertaken by the parties involved with the legal proceeding within a certain time period. Additionally, certain actions must be undertaken by the governmental entity within a certain time period that generally needs to be tracked by the parties involved in the legal proceeding. If the parties do not undertake the required or requested actions within the specified period of time, a legal right is lost. These actions range from making appearances, responding to discovery requests, filing an appeal or oppositions to a motion in a litigation case, to responding to official actions, filing formal drawings or paying fees in a patent or trademark case.

Naturally, whenever the number of cases handled by parties increases, it becomes more difficult to manage these legal cases since many of these actions have deadlines that are sometimes months if not years into the future. With the increase in litigation cases, and the rapid advancement in technology, which has created a near exponential growth in the number of patent and trademark cases, the management of these cases requires additional attention.

Docketing or calendaring is the process by which attorneys, their assistants, or clients, track the progress of a legal proceeding or legal case. Docketing can be either done manually by entering actions and their due dates onto a paper calendar, or done electronically by employing software that keeps track of actions and their due dates using electronic databases.

The importance of legal calendaring is central to the legal profession, as the tracking of actions due for a case and other data associated with the legal case are the means by which the cases are processed by the governmental entities and provide the structure for lawyers and their clients to present the merits of their case to the governmental entity. A mistake in calendaring or docketing, or the inaccessibility of docketing data, actions due and their due dates, can result in serious damage to a client's case and legal rights, and that in turn can have serious consequences for the attorney who represents a client in that legal case.

Handwritten entries onto paper calendars provided parties with means of reminding them of actions due in a legal case, however, in response to the pressures stated above, electronic docketing technologies have become more prevalent. While advances in electronic docketing have been significant in aiding parties in keeping track of their cases, many of the issues surrounding accuracy in docketing has been ignored. In particular, a significant source of error in electronic docketing is the manual entry and re-entry of data into electronic systems. For example, when the United States Patent and Trademark Office issues an official action, the official action is physically mailed to a party that has applied for a patent or their representative. The relevant information regarding the patent application case has to be manually entered into an electronic docketing system. That is, the mail date of the official action has to be manually entered into the electronic docketing system. If actions, an official action mail date or similar dates, other data, or action due dates are erroneously entered, legal rights may still be lost, even if an electronic legal docketing system is used. The problem with the current electronic docketing systems is understood better if for example one considers the procedures for "foreign filing" a trademark application internationally in 150 different countries. Even if representatives in each of those countries had the identical currently available electronic legal docketing system, the data related to the same trademark would have to be re-entered 150 times into the docketing systems of representative attorneys around the world. Needles to say, the chance of errors in docketing increase as the number the number of manual entry of data increases. Therefore, continued re-entry has a tremendous cost other than the cost of the software, maintaining the software, upgrading it, and updating the rules in it.

Other processes also contribute to more manual re-entry of substantially identical information and docketing errors, for example, whenever cases are transferred from one law firm to another. Even if the two law firms use the same commercially available electronic legal docketing system, the actions due and other associated data regarding the legal case must be manually re-entered into the new law firm's electronic docketing system. The same is true when an attorney from one law firm leaves the employ of one law firm and transfers their own cases to the new law firm. In addition to the errors that can be caused by manual re-entry of data, during the time period between when the cases were taken off from the old docketing system until the time they were re-entered into the new docketing system, some actions may come due. If these due actions are not responded to because they did not exist on the new docketing system, the case may lapse or become abandoned.

Furthermore, whenever requests for actions, such as those in the form of an official action in a patent case, is mailed to a party, there is a chance that the mailed documents will get lost in mail, or in the office of the party who received the documents. Naturally, if the documents get lost in the mail, no docketing of the actions due occurs and legal rights may be lost. Additionally, the cost of operating and maintaining electronic databases is significantly high to users. These electronic systems require individuals that are highly trained in their profession as well as system administration such as management of databases and backups.

Often during court appearances in litigation cases, a judge will set dates for parties to perform certain actions. Most legal practitioners do not have access to their docketing systems to determine whether the dates the Judge is proposing are free for the legal practitioner, or whether they have prior engagements on the days the judge is proposing.

Therefore, the current electronic docketing systems do not address the problems associated with legal case docketing especially in regards to manual re-entry of substantially identical information.

The insufficiencies of the current electronic legal docketing systems are demonstrated when one considers that nearly fifty percent (50%) of all legal malpractice cases against attorneys in the United States are as a result of docketing errors. That is, of all the litigation cases clients bring forward against their own attorneys, half are based upon the attorney or law firm's errors in docketing an action, which resulted in the extinguishments of a legal right of the attorney's client.

Put in context, the amount of money spent by clients on legal fees currently exceeds $100 Billion in the U.S. alone. Further, there are now nearly one million attorneys in the U.S. Therefore, the amount of money at stake and the number of people affected can be quite significant when it comes to ensuring that docketing is done properly and is made readily accessible. The importance of the problems that exist in docketing has not been lost to legal malpractice insurance companies, which now provide significant cash discounts to attorneys on their annual malpractice premiums if the attorney can demonstrate that they have redundant docketing systems to reduce the likelihood of error. Therefore, some firms have undertaken to use electronic and redundant docketing systems, which has increased the cost of managing them. For others, the cost of electronic and redundant docketing is prohibitive as these "standalone" systems require installation, hardware requirements, office networking, database maintenance, software upgrades, conversion of data from the old database to the new database after software upgrades, and legal rules updates, which has left many legal practitioners without the use and benefit of appropriate case management systems.

In view of the foregoing, there is a significant need for a computer based centrally managed legal docketing system that reduces manual re-entry of legal data to reduce the possibility of docketing errors.

There is an additional need for an intelligent docketing system that automatically dockets certain action only from entry of other data, such as when a foreign filing date is docketed when one provides a case filing date to the docketing system.

There is also a need for a legal docketing system that enables the user to access and edit their actions due, actions due date, and legal data regardless of their physical location.

Further, there is a need for a computer docketing system that provides users with centralized storage, access, and editing of their electronic data via the Internet.

There is also a need for a computerized docketing system wherein the user can customize the type of reminders, quantity of reminders, and time of reminders. Additionally, there is a need for legal docketing system that can provide action due reminders to parties in various forms including facsimile and electronic mail message.

Lastly, such a system must be affordable and reduce the cost in maintaining databases, maintaining back up of databases, updating legal rules and requirements tailored to particular legal practices, and upgrading software without data conversion.

SUMMARY

The invention described is a computer based method for on-line legal docketing using an electronic customizable client rules subset. The method of the invention comprises of the following steps. Under control of a client system, a docket request message is sent to a host server system that is identified by a first uniform resource locator (URL), the host server system having a client case listing database containing legal case information from at least one client systems. The docket request message further comprises of a pattern data and a pattern data date. Under control of the host server system, it receives the docket request message, identifies the client system using a client system identifier, identifies the customizable client rules subset in a rule module database associated with the identified client system, and using the pattern data contained, in the docket request message selects at least one associated action prompt from the customizable client rules subset. Once the action prompt is selected, the host server system computes an action prompt due date for each of the associated action prompts using the pattern data date and a time calculus. The action prompt and the computed action prompt due date are recorded in the client system case listing database for the legal case selected by the client system.

The computer based system for on-line legal docketing using an electronic customizable client rules subset, comprises of at least one client systems, each client system identified by a unique uniform resource locator wherein under control of a client system a docket request message is sent to a host server system. The docket request message further comprises of a pattern data and a pattern data date. The host server system which is identified by a uniform resource locator further comprises of a customizable client rules subset, the client rules subset further comprising pattern data and at least one action prompt associated with the pattern data, an identicator for identifying the client system, a client case listing database containing legal case information from at least two client systems. The host server system receives a docket request message from the client system, identifies the client system using a client system identifier, identifies the customizable client rules subset for the client system, using the pattern data contained in the docket request message selects an action prompt from the customizable client rules subset, computes an action prompt due date for each of the action prompts using the pattern data date and time calculus, and records the client system defined action prompt and computed action prompt due date for the legal case selected by the client system.

The advantages of the described docketing system are that it reduces manual re-entry of legal data to reduce the possibility of docketing errors.

Another advantage is that the legal docketing system enables users to access and edit their action prompts, action prompt due dates, and legal data regardless of their physical location.

Yet another advantage of the computer based docketing system is that the user can customize the type of action prompts, quantity of action prompts, and time of action prompts.

Lastly, such a system is affordable and reduces the cost of docketing in maintaining databases, maintaining back up of databases, updating legal rules and requirements tailored to particular legal practices, and upgrading software without data conversion.

These and other advantages of the invention will become more fully apparent when the following detailed description of the invention is read in conjunction with the accompanying drawings.

BRIEF DESCRIPTION OF DRAWINGS

FIG. 6 shows a graphic interface screen of the docketing system of the invention with default action prompts.

FIG. 7 shows a graphic interface screen of the docketing system of the invention with customizable action prompts, time calculus, and action prompt delivery type.

FIG. 8 shows a graphic interface screen of the docketing system of the invention with multiple action prompts associated with and triggered from pattern data.

DETAILED DESCRIPTION

This invention provides a real-time computer based on-line method and system for legal docketing between a Host Server System 10 and at least one Client Systems 12. Electronic transmissions between the Client System and the Host Server System occur over the Internet 22. In preferred embodiments, the Host Server System communicates with their-party systems such as Governmental System 24 and Authorized System 26 via the Internet 22. Examples of a Governmental System are a patent office, trademark office, or a court. Examples of an Authorized System are a representative of a Client System such as an attorney or one who has a power of attorney from the Client System or the Host Server System.

An electronic transmission is any transmission that allows for access of electronic data, processing of electronic data, or presentation of electronic data. Such electronic transmissions optionally take the form of a Docket Request Message 28, Action Prompt Reminder 30, or Request Message To File 32.

Registration

Figure 1:
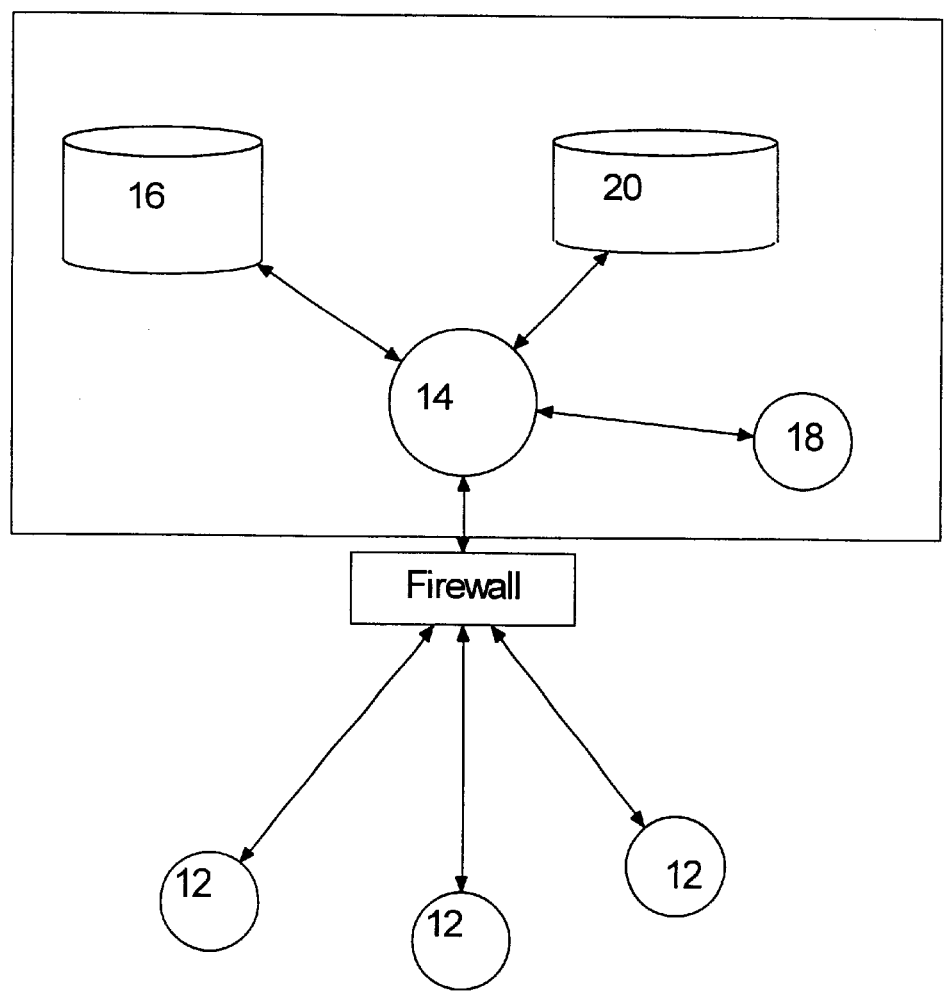
FIG. 1 shows an embodiment of the invention having gateway server, a rules module database, a case listing database and an Identicator module.

As shown in FIG. 1, a Client System preferably registers an Identifier 34 with the Identicator Module 18, which is stored in the Identicator Database 36. The Identifier 34 is any one or combination of the following; a name, a user name-password combination, an email address, a digital certificate, a digital signature, personal identification code, membership numbers, an electronic "cookie", or any other alpha numeric character string that would identify the Client System to the Host Server System. Preferably, at the time of registration of Client Systems, each Client System is assigned a username-password combination that is unique and exclusive to the Client System.

For purposes of this invention a Client System optionally has a multitude of users and subordinated users with various degrees of access to data residing on the Host Server System databases and functionalities of the Host Server System modules. All users and subordinated users of Client System have the ability to see all or a subset of the data of that Client System. Users or subordinated users of a second Client System are unable to see any portion of the legal case data of a first Client System and vice versa. For example, a first Client System comprises of the users and subordinated users of a law firm, e.g., user docket clerks, subordinated users attorneys, their clients, and other assistants and secretaries working for a law firm. A second Client System comprises of a user sole practitioner and his/her subordinated user clients. Therefore, the users and subordinated users of the first Client System do not have access to the second Client System's legal case data residing on the Host Server System.

In an embodiment, a user in the Client System registers with the Host Server System 10 as a primary user. This means that the primary user optionally gives access to, restricts access, modifies, or otherwise controls a subordinated user's accessing, processing, or presenting of legal case data that is stored on various Host Server System databases and functionality of various Host Server System functionalities. This is desired, for example, when the primary user is a docket clerk who wishes to influence or govern the calendaring activities of an attorney or a client of the attorney, who as subordinated users are permitted access to for example view legal case data only or obtain reports of legal cases only. In this embodiment of the invention, the primary user registers with the Host Server System 10 any subordinated user Identifier 34. Separate and unique Identifiers are issued by the Identicator for the primary user and the subordinated user, respectively. The user defines the subordinated user's access limits and restrictions on the use of the Host Server System. In one embodiment a subordinated user is prohibited from edit or write capabilities. In a different embodiment, a subordinate user optionally provides access to other subordinated users.

Once a user or subordinated user logs onto the Host Server System and is identified by the Identicator, the subordinated user's Identifier is forwarded to the Identicator Module 16 for identification purposes. Once the user or subordinate users of a Client System are identified, the Host Server System 10 identifies the Client Rules subset 42 within the Rule Module Database that pertains to the Client System.

In an embodiment third-parties such as Third-party Authorized Systems 26 or Governmental Systems 24 register unique Identifiers 34 with the Host Server System. Thereafter, whenever the Third-party Authorized System or Governmental System wishes to communicate with the Host Server System, an Identifier is presented to the Host Server System for identification purposes.

Communication-lines

Communications between the Client System 12, the Host Server System 10, Third-party Authorized System 26 and Governmental System 24 occur via the Internet. There are many different ways to transmit messages between the Client System, the Host Server System, the Authorized System, and the Governmental System, both tethered and wireless, including TCP/IP, all of which are well understood in the industry.

Host Server System

As seen in FIG. 1 the Host Server System 10 comprises of an Identicator Module 18, a Rules Module Database 16, a Case Listing Database 20, and Gateway Server 14. Preferably, the Host Server System further comprises of a Firewall (Not Shown), a Decryption Module 40 and a Logging Facility 38. In a preferred embodiment, more than one Host Server System 10 provides fault tolerance from either natural or man-made disasters. In this embodiment, each Identicator uses a backup power generator, redundant hardware, mirrored databases, and other standard fault tolerant equipment known in the industry.

The Host Server System 10 hardware devices are high-reliability database servers, well known in the art, such as those available from Sun™, Compaq™, Tandem™, IBM™ and the like. Further, the Host Server System 10 software may incorporate scalable database architecture, well known in the art, such as those available from Oracle™, Sybase™, Informix™ and the like.

Gateway Server

The Gateway Server 26 serves as an intermediary between Identicator Module 18, Case Listing Databases 20, Rules Module Database 16, and other modules and databases of Host Server System. Gateway Server is also responsible for execution of electronic commands as dictated by instructions and Action Prompts 30 and Action Prompt Due Dates in the Rules Module Database 16, and routing electronic transmissions from overloaded servers on to servers that have available capacity. The Gateway Server 14 also periodically queries servers to ensure that are operative and to alert the system administrator is any server is inoperative.
Firewall A firewall (not shown) provides a first line of defense against network viruses and computer hackers. All communication links into or out of the Host Server System 10 preferably first pass through a secure firewall machine.
Decryption Module In a preferred embodiment, all messages the Host Server System 10 receives contain an Identifier 34, a sequence number, and a Message Authentication Code (MAC). MACs, also known as cryptographic checksums, are well known in the computer industry, and are used to assure that any changes to the content of the message will be detectable by the entity receiving the transmission. The Decryption Module 40 validates the message's MAC and checks the sequence number for that particular Client System. If the Decryption Module 40 determines that both the MAC and the sequence number are valid, the DM uses the unique secret key for that particular Client System 16 to decrypt the message. For the decryption to function properly, the Decryption Module 40 must contain a copy of each Client System's DUKPT key table.

If the decryption operation fails, or if the MAC check fails, the message is considered an invalid message. The Decryption Module 40 logs a warning to the Logging Facility 38, terminates processing for the message, and returns an error message to the originating Client System. Before the Decryption Module 40 replies to a message that includes a response key, it encrypts the response message with that response key. The Decryption Module 40 also generates a MAC for the response and appends it to the message.
Logging Facility In a preferred embodiment, the Logging Facility 38 logs all electronic transmissions, whether successful or not, to write-once media, so that a record is kept of each transmission and each error that has occurred during the operation of the Identicator. Additionally, Logging Facility 38 maintains a record of all changes made to the legal case data in the Case Listing Database 20.
Identicator Module (Identicator)

The Identicator Module 18 (Identicator) serves to identify the user or the subordinated user, and the Client System in an electronic transmission. The Identicator compares a user's bid Identicator with previously registered Identicator stored in the Identicator Database 36, in order to identify the user. If a bid Identifier is successfully matched against a registered Identifier, the user is positively identified.

Figure 2:
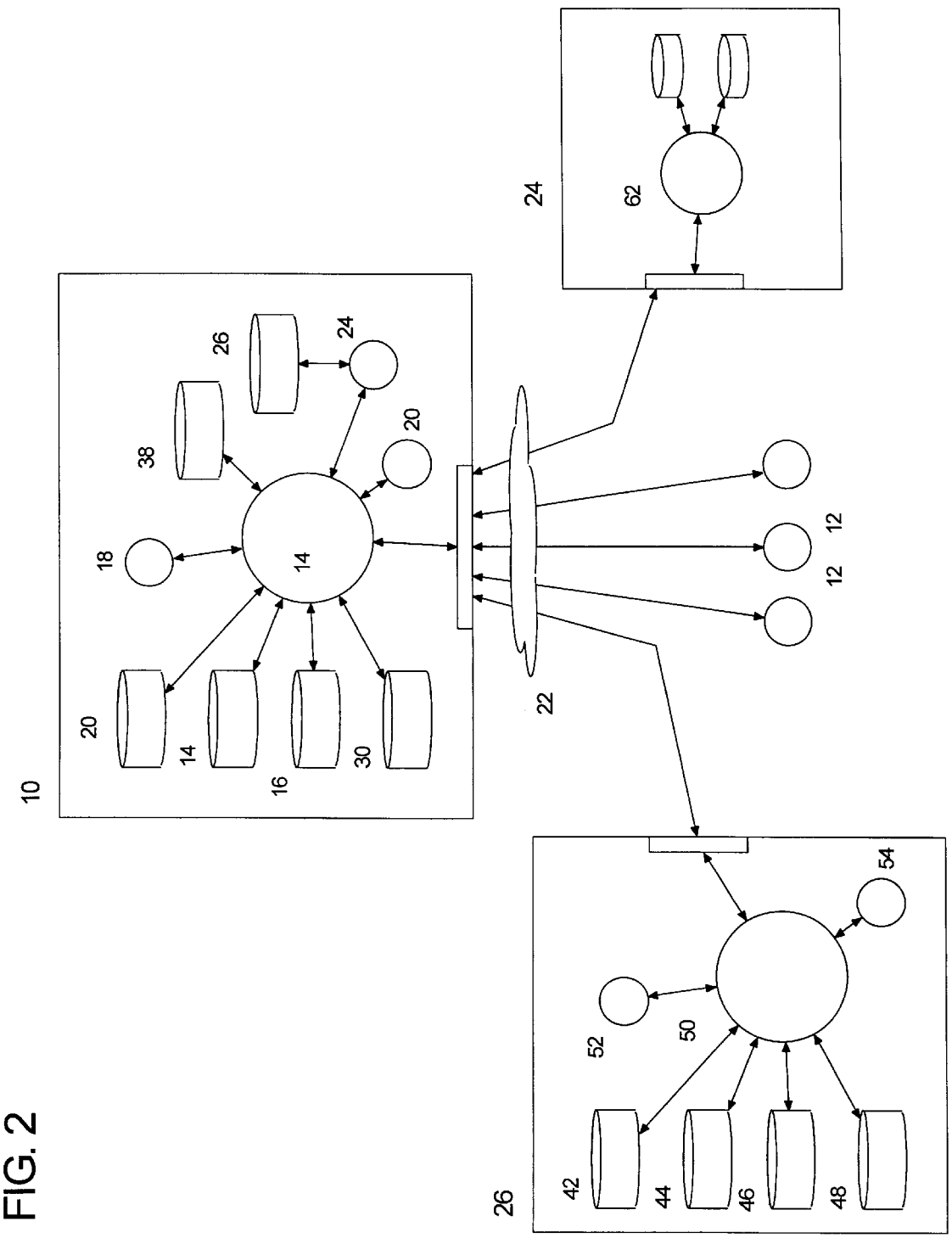
FIG. 2 shows a preferred embodiment of the invention having automated docketing and filing modules for interactions between the host server system, a governmental system, and a third-party authorized system.

As seen in FIG. 2, the Identicator 18 is connected to the Internet 22 through Gateway Server 14. The Gateway Server is responsible for overseeing the steps required to process a Docket Request Message 28, a Request Message to File 32, an Action Prompt Reminder 30, and other electronic transmissions, between the various modules and databases of the Host Server System 10.

In another embodiment, a third-party such as the Governmental System 24 or Third-party Authorized System 26 are identified by the Identicator using any one or combination of the following electronic verification means: a third-party username-password combination, a digital certificate, an Internet protocol ("IP") address, or any other code, text or number that uniquely identifies the third-party. In this way, the Identicator Module is able to identify the third-party.

Identification of a third-party and the users of a Client System 12 occurs using different methods, depending on the identification information that is provided by the user or subordinated user of the Client System. The Identicator has subsystems for each type of Identifier information that is received by the Identicator, and each subsystem is highly optimized to provide rapid identification.

In a preferred embodiment, Identicator 18 comprises of a subsystems that can identify parties from digital identification information (digital certificates). In this embodiment the Identicator comprises of a multiple processors, each of which is capable of identifying a third-party from their digital certificates. Digital certificates are used to perform digital identification of a third-party. Where possible, computers provide digital certificates for identification of the third-party system.

Figure 3:
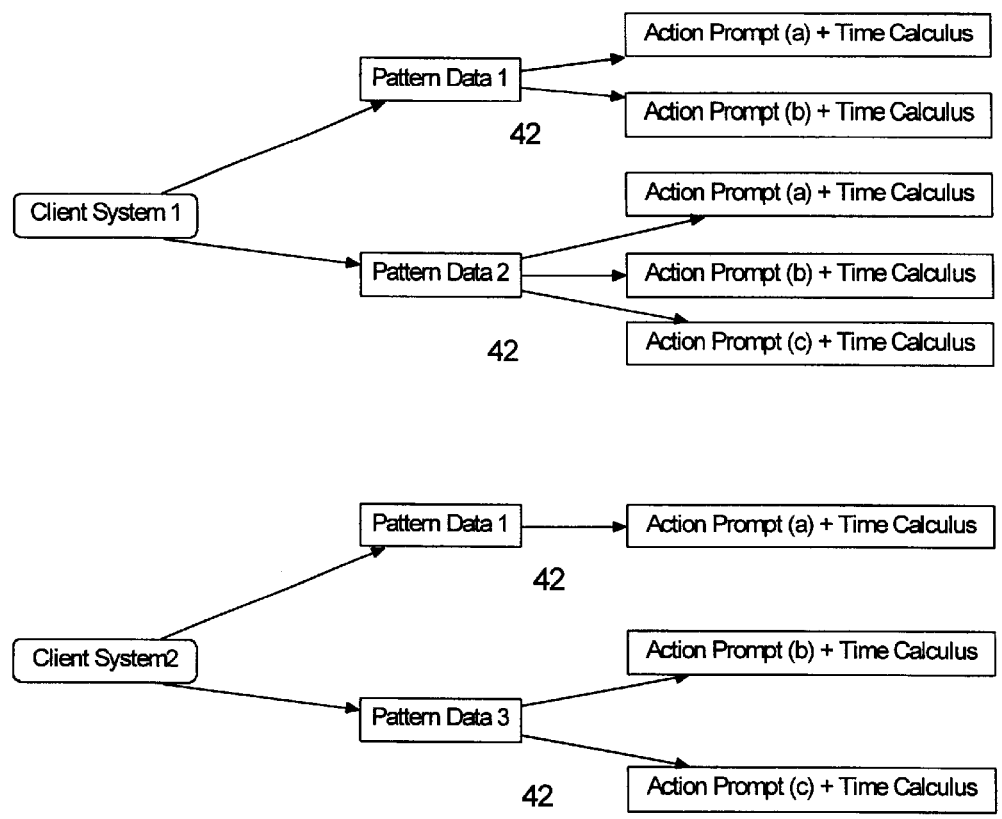
FIG. 3 shows a graphic representation of a rule module database having client rules subsets and its components and the relationship between action prompts and data patterns.
Figure 4:
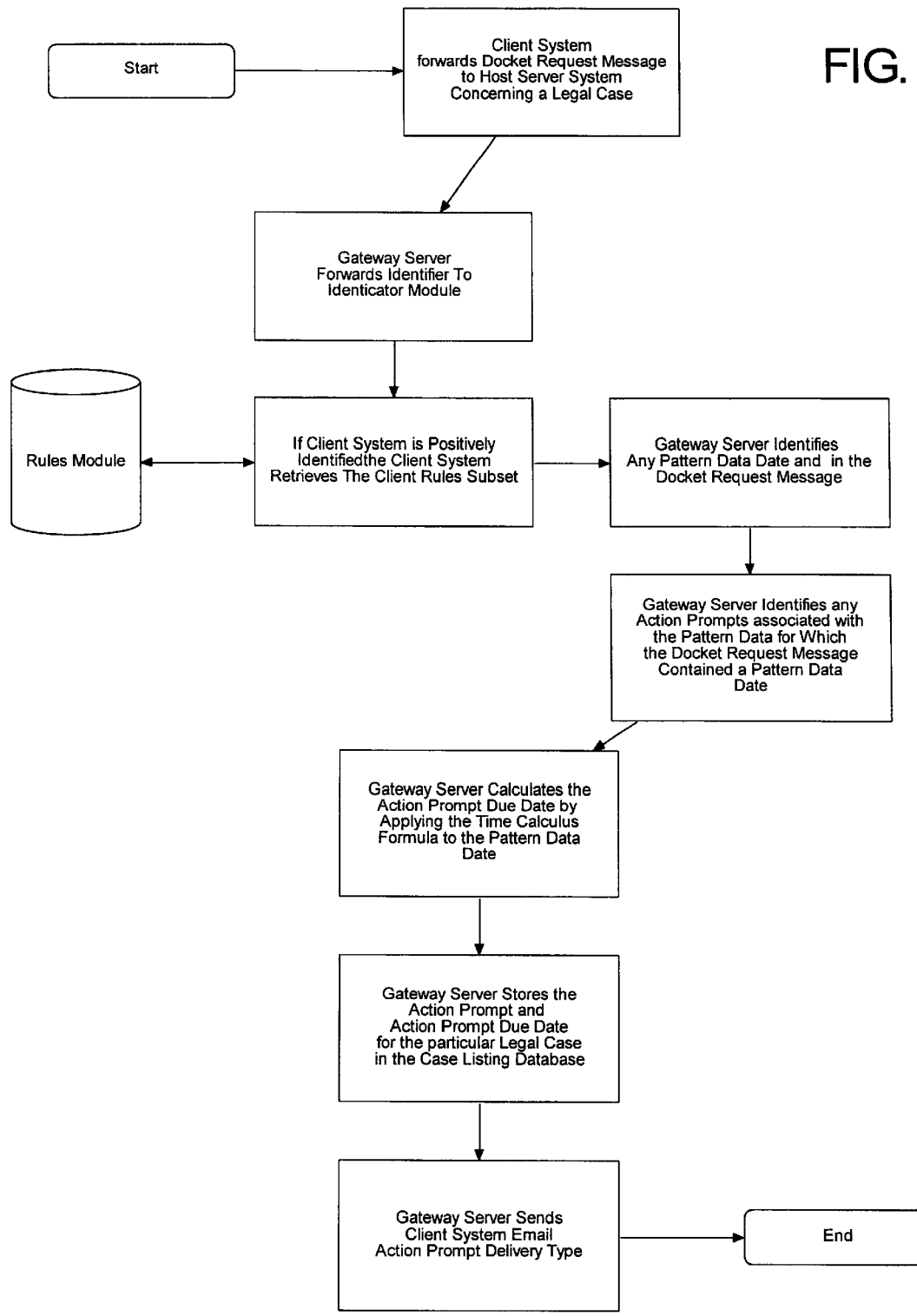
FIG. 4 shows a flow chart preferred embodiment of legal docketing using the customizable client rules subset.

Verifying that a particular digital certificate is valid requires a public key from the certifying authority that issued that particular digital certificate. This requires that the digital identification subsystem have a list of certifying authorities and the public keys used to validate the digital certificates they issue. This table must be secure, and the keys stored therein must be kept up to date. These processes and others relating to the actual process for validating digital certificates are well understood in the industry.
Rules Module Database As shown in FIG. 3 the Rule Module Database 16 contains Client Rules Subset 42 for each Client System 12. Each Client Rules Subset is modifiable by the Client System and therefore customizable to the requirements of that Client System. Optionally, each user or subordinated user of the Client System 12 can define Client Rules Subset 42 to fit their unique requirements. Therefore, each Client System optionally has multiple Client Rules Subset 42.

Regardless, each time a Client System user or subordinated user logs on, the Host Server System 10 identifies the user or subordinated user using the Identicator Module 18 and identifies the Client Rules Subset 42 for that Client System, user, or subordinated user.

As shown in FIG. 3 the Client Rules Subset contains one or more Pattern Data 44, each associated with an Action Prompt 30 and Time Calculus 46. A single Pattern Data 44 is optionally associated with more than one Action Prompt 30, thereby forming multiple Action Prompt Due Dates from a single Pattern Data. Each Action Prompt 30 has at least one Time Calculus 46 associated with it.

Pattern Data 44 comprises of any one or combination of the following; a case filing date field, an official action mail date field, a case registration date field, a case appearance date field, a notice of allowance mail date field, a statement of acceptance date field, a publication date field, an entry of judgment date field, and a priority date field.

An Action Prompt 30 comprises of any one or combination of the following, action prompt to file a patent, action prompt to file a trademark, action prompt to file a response, action prompt to file an answer, action prompt to file a legal form, action prompt to submit a fee, action prompt to check status, action prompt to search for a document, action prompt to file an appeal, and action prompt to appear at a hearing, action prompt to file a motion.

A Time Calculus 46 comprises of any one or combination of the following; a formula for computing a date forward from a Pattern Data, a formula for calculating a date backwards from a Pattern Data.

As shown in FIG. 6 in a preferred embodiment, upon registration of the Client System, the Host Server System provides the Client System with a default Client Rules Subset 42. Each default Client Rules Subset preferably has Pattern Data 44 relating to a particular legal field, such as patent prosecution, trademark prosecution or litigation, an Action Prompt 30 associated with the Pattern Data and a Time Calculus 46. Thereafter, as shown in FIG. 7 the Client System optionally modifies any one or combination of the Pattern Data, Action Prompt, or the Time Calculus. The Pattern Data, Action Prompt, or the Time Calculus is optionally modifiable by a third-party authorized by the Client System.

The Client System has the capability to delete, add or edit associations between any Pattern data 44 and any Action Prompt or to delete, add, or edit, any Time Calculus 46 associated with an Action Prompt.

In a preferred embodiment the customizable Client Rules Subset further comprises of an Action Prompt Delivery Type 48. These comprise of an electronic mail message, a facsimile, a printed report in response to a report request, and a display on an electronic display monitor. In an Action Prompt notification step the Client System 10 optionally transmits an electronic message to the Client System 12 or to a third-party authorized by the Client System. The Action Prompt Delivery Type 48 is optionally modified by the Client System or by a third-party authorized by the Client System.

Action Prompt

Figure 5:
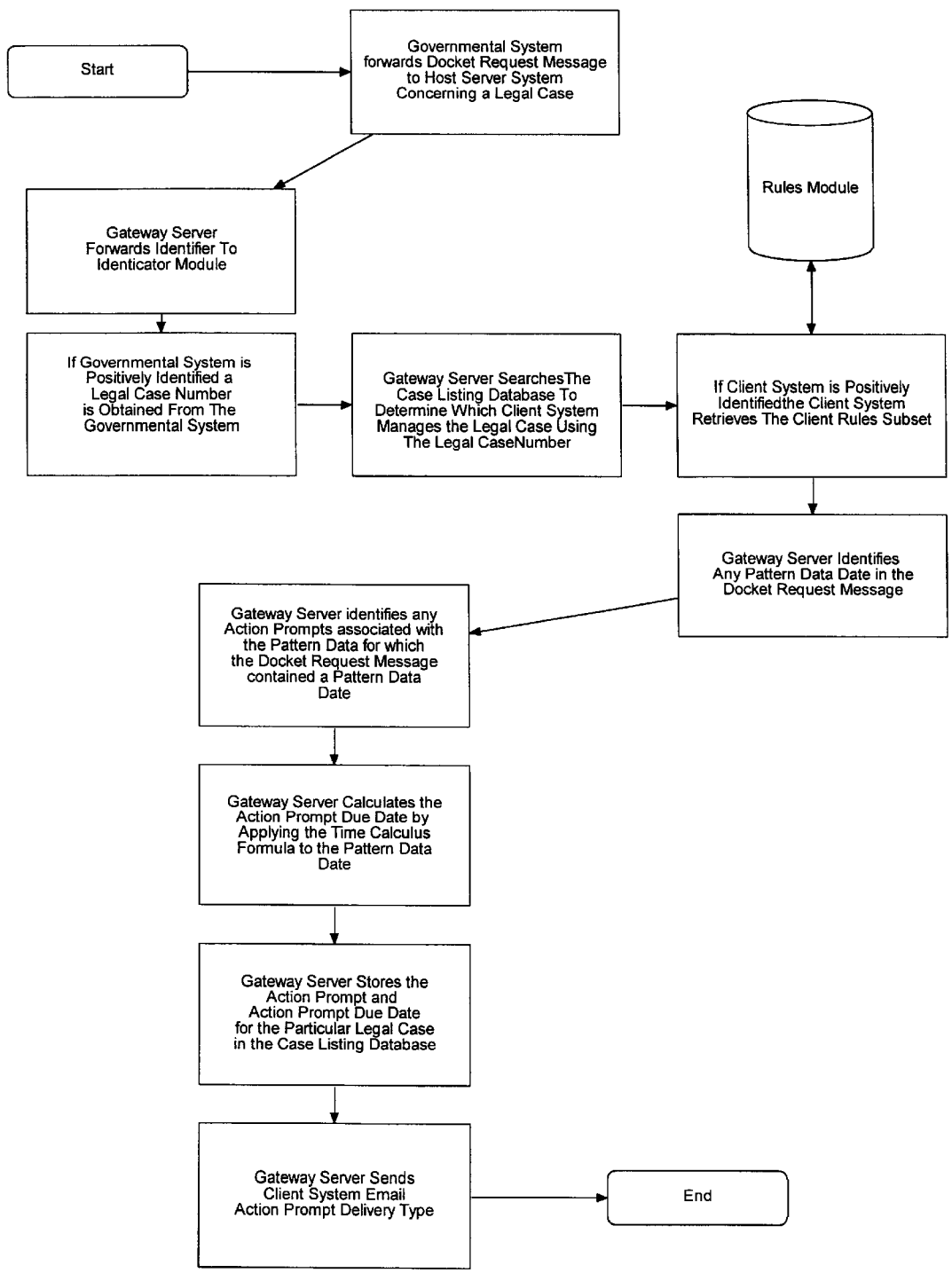
FIG. 5 shows a flow chart of the preferred embodiment of automated docketing for a client system through interfacing with a governmental entity.

The Action Prompt 30 and Action Prompt Due Date (Not shown) provide the vehicle for notifying users of a Client System of the type of action that needs to be taken in the governmental or legal proceeding and the time that such action should be taken, or a reminder in advance of the time an action should be taken. The Action Prompt Due Date is calculated using the Time Calculus 46 and a Pattern Data Date. Therefore, as shown in FIG. 5 and FIG. 8 in determining what type and what time an action needs to be taken by the Client System, the Client System submits only a Pattern Data 44, a Pattern Data Date 50 and a case number which identifies the legal case that the Action Prompt 30 and Action Prompt Due Date should be generated for, in a Docket Request Message 28. Thereafter the Host Server System retrieves that Client System's Client Rules Subset. The Host Server System then identifies the Pattern Data and the Pattern Data Date in the Docket Request Message 28. The Host Server System determines what Action Prompts are associated with the Pattern Data submitted in the Docket Request Message by the Client System in the Client Rule Subset 42. For each Action Prompt associated with the Pattern Data submitted in the Docket Request Message, the Host Server System computes the Action prompt Due Date by applying the formula of the Time Calculus 46 to the Pattern Data Date provided in the Docket Request Message. Therefore, the Host Server System generates the Action Prompt (what action needs to be taken by the Client System) and the Action Prompt Due Date (the time an action needs to be taken by the Client System) only from a Pattern Data and Pattern Data Date in the Docket Request Message. In a preferred embodiment the Host Server System then determines if the Client System 12 has selected an Action Prompt Delivery Type 48. If the Client has chosen an action Prompt Delivery Type of an electronic mail message, then the Gateway Server causes an electronic mail message to be sent to an electronic mail list identified for the legal case by the Client System notifying them of the Action Prompt and the Action Prompt Due Date. If no Action Prompt Delivery Type has been designated, then the Host Server System saves the Action Prompt and the Action Prompt Due Date in the Case Listing Database 20 for future retrieval by the Client System. The retrieval of the Action Prompt and Action Prompt Due Date is optionally either through a report generated for Action Prompts and Action Prompt Due Dates, or through a search of a specific legal case in the Case Listing Database.

Optionally, the method of the invention includes the Host Server System performing a date conflict check step wherein the Client System is notified if two Action Prompt Due Dates fall on the same date.

As defined herein, a customized Client Rules Subset 42 does not necessarily have Pattern Data 44, Action Prompt 30, or Time Calculus 46 that is unique to a Client System, but rather that they are indexed to or are associated with a specific Client System or Client System user or subordinated user. As such, the same Pattern Data 44 or Action Prompt 30 is optionally assigned to several Client Systems, and hence would not be unique to any one Client System.

Automated Docketing System

As shown in FIG. 5 in one embodiment, a Docket Request Message 28 is forwarded from the Governmental System 24 to the Host Server System 10. The Docket request Message comprises of a Governmental System Identifier 34, Pattern Data 44 and Pattern Data Date for a legal case identified by a case number. Preferably, the Docket Request Message also includes a Client System Identifier 34. The Identicator Module 18 identifies the Governmental System using the Governmental System (third-party) Identifier, identifies the legal case in the Case Listing Database using the case number, and identifies the Client Rules Subset 42 in the Case Listing Database 20 for the Client System that manages the particular legal case that the Governmental System submitted a Docket Request Message for. The Gateway Server 14 then identifies the Pattern Data and the Pattern Data Date in the Docket Request Message 28 forwarded by the Governmental System. From the Pattern Data in the Docket Request Message, the Host Server System determines the Action Prompts that are associated with the Pattern Data from the Client Rule Subset 42. For each Action Prompt the Host Server System computes the Action prompt Due Date by applying the formula of the Time Calculus to the date provided in the Docket Request Message. Therefore, the Host Server System derives the Action Prompt (what action needs to be taken by the Client System) and the Action Prompt Due Date (the time an action needs to be taken by the Client System) only from the Pattern Data and Pattern Data Date in the Docket Request Message. In a preferred embodiment the Host Server System then checks to define if the Client System 12 has selected an Action Prompt Delivery Type 48. If the Client has chosen an action Prompt Delivery Type that includes an electronic mail message system, then the Host Server System causes an electronic mail message to be sent to an electronic mail list identified for the legal case by the Client System notifying them of the Action Prompt and the Action Prompt Due Date. If no Action Prompt Delivery Type has been designated, then the Host Server System saves the Action Prompt and the Action Prompt Due Date in the Case Listing Database 20 for future retrieval by the Client System.

Optionally, the Governmental System appends an electronic document, in ASCII, Word Perfect, MSWord, GIF, JPG, PDF, or any other type of format to the Docket Request Message.

The Action Prompt notification step and retrieval of the Action Prompt and Action Prompt Due Date has been described earlier. In this manner, the Host Server System 10 automatically calendars Action Prompts and Action Prompt Due Dates for a legal case without the manual re-entry of Pattern Data and Pattern Data Dates into a legal docketing system.

In a different embodiment, the Host Server System registers with the Governmental System 24 and submits an Identifier 34 with the Governmental System. In this embodiment, the Gateway Server 14 of the Host Server System queries the databases of the Governmental System for particular legal cases using legal case numbers such as those generally assigned to the legal case by the Governmental System. Preferably, in confidential cases, the Host Server System obtains an Authorization Code form the Client System, wherein the Authorization Code is recognized by the Governmental System as authorization given by the Client System to the Host Server System for querying the Governmental System databases for data regarding a legal case.

An Authorization Code comprises of any one or combination of the following; a Client System name, a Client System code, a user name-password combination, an email address, a digital certificate, a digital signature, personal identification code, membership numbers, an electronic "cookie", or any other alpha numeric character string that would indicate to the Governmental System that the Host Server System is authorized to query the Governmental System databases for the status, Pattern Data, Pattern Data Dates, or any other data of a legal case.

Once the Host Server System obtains Pattern Data and Pattern Data Dates for a particular legal case identified by a legal case number, the Host Server System identifies the Client System that manages the legal case using legal case numbers such as those generally assigned to the legal case by the Governmental System, and proceeds to calendar any necessary Action Prompts and Action Prompt Due dates as described above.

Automated Document Generation and Filing System

In a preferred embodiment, the Host Server System further comprises of a document generation step wherein any one or combination of the following documents are created by the host server system using information contained in the Case Listing Database 20; legal documents, action prompt reports, action prompt due date reports, client system defined forms, and client system defined letters. In an embodiment the documents are prepared automatically as a result of a time criteria. The time criteria are optionally defined by the client system in the host server system and optionally include a set date.

In an embodiment, the document generated automatically is in response to defined search parameters, wherein the search parameters are selected from any one or combination of the following; case number, case file date, government case serial number, registration number, registration date, attorney in charge, case owner, case client, case domestic representative, case foreign representative, case plaintiff, case defendant, publication number, publication date, notice of allowance date, and case status.

In a preferred embodiment, whether the document is automatically generated or not, it is automatically electronically forwarded to any one or combination of the following; the client system, a Governmental System 24, a Third Party Authorized System 26 as instructed by the Client System. Example of a Legal Case Transfer from One Attorney to Another In this example an attorney is a user of the first Client System. The first Client System is registered with the Host Server System and the attorney has read and edit authorization. The legal case of a client of the attorney is contained in the Case Listing Database and Action Prompts 30 and Action Prompt Due Dates are generated by the Gateway Server 14 as per the Client Rules Subset 42 of the first Client System. Thereafter, the legal case is transferred from the first Client System to a second Client System by instructions of the client. If the Second Client System is registered with the Host Server System, preferably by authorization of the client, the administrator of the Host Server System, edits the legal case data for the transferred case to indicate that the second Client System 12, with a new attorney, a new address, a new email address, or any other new data, has been designated in charge of the legal case in the Host Server System's database, and stores the specific legal case under the second Client System cases in the Case Listing Database 20.

Preferably, from then on the second Client System 12 receives Action Prompts 30 and Action Prompt Due Dates, using Action Prompt Delivery Types 48 specified by the second Client System. In this manner, legal docketing has been accomplished according to the reminder schedules and terminology of the second Client System without manual entry of substantially identical data and without delay.

If the second Client System is not registered with the Host Server System, preferably they register with the Host Server System and specify their preferences for Action Prompts, Action Prompt Due Dates, Time Calculus 46, and Action Prompt Delivery Type 48 in the Client Rules Subset. Once the second Client System is registered, the administrator of the Host Server System transfers the legal case to the second Client System as specified above.

From the foregoing, it will be appreciated how the objectives and features of the above-described invention are met.

First, the invention provides a computer based electronic legal docketing system that eliminates the need for users in a client system, such as attorneys in a law firm, to manually re-enter calendaring information regarding a legal case into a docketing system.

Second, this invention provides the ability for the docketing system to interface with a third-party server and database such as a governmental system or authorized third-party to automatically docket or calendar action prompts and action prompt due dates without the need to manually re-enter the calendaring information or data regarding a legal case into a docketing system.

Third, the invention provides a system for ensuring that users have the portability and mobility to gain immediate access to their legal calendaring information via the Internet.

Fourth, this invention provides a user-customized client rules subset wherein user client systems can choose their action prompts, the due date schedule for action prompts, and multiple action prompts for particular actions that have to be performed.

Fifth, this invention enables primary users to both register and govern the calendaring activities of subordinated users.

Sixth, the invention provides a cost-effective computerized electronic transmissions system that is practical, convenient, and easy use.

Although the invention has been described with respect to a particular computer based calendaring system having a customizable client rules subset and the method for its use, it will be appreciated that various modifications of the apparatus and method are possible without departing from the invention, which is defined by the claims set forth below.

What is claimed is:

1. A computer based method for on-line legal docketing using an electronic customizable client rules subset, said method comprising the steps of:
   a. under control of a client system,
      i. sending a docket request message to a host server system identified by a first uniform resource locator, the host server system having a client case listing database containing legal case information from at least two client systems,
      ii. the docket request message further comprising pattern data and a pattern data date,
   b. under control of the host server system,
      i. receiving the docket request message,
      ii. identifying the client system using a client system identifier,
      iii. identifying the customizable client rules subset in a rule module database associated with the identified client system, wherein the host server system has a customizable client rule subset from at least two client systems,
      iv. using the pattern data contained in the docket request message selecting at least one associated action prompt from the customizable client rules subset,
      v. computing an action prompt due date for each of the associated action prompts using the pattern data date and a time calculus, and
      vi. recording the action prompt and computed action prompt due date for the legal case selected by the client system.

2. The method of claim 1 wherein the customizable client rules subset comprises of a client system client rules subset identifier, at least one pattern data, at least one action prompt associated with the pattern data, and at least one time calculus associated with the client system action prompt.

3. The method of claim 1 wherein the time calculus is modifiable by any one or combination of the following; by the client system and by a third party authorized by the client system.

4. The method of claim 1 wherein the action prompt is modifiable by any one or combination of the following; by the client system and by a third party authorized by the client system.

5. The method of claim 1 wherein the client rules subset further comprises of at least one action prompt delivery type.

6. The method of claim 5 further comprising an action prompt delivery type notification step selected from one or more of the following; an electronic mail message, a facsimile message, a printed report in response to a report request, and a display on an electronic display monitor.

7. The method of claim 5 wherein the client system defined action prompt delivery type is modifiable by any one or combination of the following; by the client system and by a third party authorized by the client system.

8. The method of claim 1 further comprising a document generation step wherein any one or combination of the following documents are created by the host server system using information contained in the case listing database; legal documents, action prompt reports, action prompt due date reports, client system defined forms, and client system defined letters.

9. The method of claim 8 wherein the documents are prepared automatically as a result of a time criteria.

10. The method of claim 8 wherein the time criteria is defined by the client system in the host server system.

11. The method of claim 8 wherein the time criteria is a set date.

12. The method of claim 8 wherein the document is generated in response to defined search parameters.

13. The method of claim 12 wherein the search parameters are selected from any one or combination of the following; case number, case file date, case government serial number, registration number, registration date, attorney in charge, case owner, case client, case domestic representative, case foreign representative, case plaintiff, case defendant, publication number, publication date, notice of allowance date, and case status.

14. The method of claim 8 wherein the document is electronically forwarded to any one or combination of the following; the client system, a Governmental System, a third party designated by the client system.

15. The method of claim 1 wherein pattern data comprises of any one or combination of the following; a case filing date field, an official action mail date field, a case registration date field, a case appearance date field, a notice of allowance mail date field, a statement of acceptance date field, a publication date field, an entry of judgment date field, and a priority date field.

16. The method of claim 1 wherein the action prompt comprises of any one or combination of the following, action prompt to file a patent, action prompt to file a trademark, action prompt to file a response, action prompt to file an answer, action prompt to file a legal form, action prompt to submit a fee, action prompt to check status, action prompt to search for a document, action prompt to file an appeal, and action prompt to appear at a hearing, action prompt to file a motion.

17. The method of claim 1 wherein the time calculus comprises of any one or combination of the following; a formula for computing a date forward from a base date, a formula for calculating a date backwards from a base date.

18. The method of claim 1 further comprising a date conflict check step wherein the client system is notified if two action prompt due dates fall on the same date.

19. The method of claim 1 wherein the identifier is any one or combination of the following, a user name, a password, an email address, a digital certificate, a digital signature, personal identification code, membership numbers, an electronic "cookie", any other alpha numeric character string that would identify the client system to the host server system.

20. A computer based system for on-line legal docketing using an electronic customizable client rules subset, said system comprising:
   a. at least two client systems, each client system identified by a unique uniform resource locator;
      i. wherein under control of a client system a docket request message is sent to a host server system,
      ii. the docket request message further comprising pattern data and a pattern data date,
   b. the host server system identified by a uniform resource locator further comprising;
      i. a customizable client rules subset, the client rules subset further comprising pattern data and at least one action prompt associated with the pattern data,
      ii. an identicator for identifying the client system,
      iii. a client case listing database containing legal case information from at least two client systems,
      iv. wherein the host server system receives a docket request message from the client system,
      v. identifies the client system using a client system identifier;
      vi. identifies the customizable client rules subset for the client system, wherein the host server system has a customizable client rule subset from at least two client systems vii. using the pattern data contained in the docket request message selects an action prompt from the customizable client rules subset, viii. computes an action prompt due date for each of the action prompts using the pattern data date and time calculus, and ix. records the client system defined action prompt and computed action prompt due date for the legal case selected by the client system.

21. The system of claim 20 wherein the customizable client rules subset comprises of a client system rule module identifier, client system defined pattern data associated with the client system rule module identifier, a client system defined action prompt associated with the client system pattern data, and a client system defined time calculus associated with the client system action prompt.

22. The system of claim 20 wherein the time calculus is modifiable by any one or combination of the following; by the client system and by a third party authorized by the client system.

23. The system of claim 20 wherein the action prompt is modifiable by any one or combination of the following; by the client system and by a third party authorized by the client system.

24. The system of claim 20 wherein the customizable client rules subset further comprises of an action prompt delivery type.

25. The system of claim 24 further comprising an action prompt notification module wherein an action prompt delivery type is selected from one or more of the following; an electronic mail message, a printed report in response to a report request, and a display on an electronic display monitor.

26. The system of claim 24 wherein the action prompt delivery type is modifiable by any one or combination of the following; by the client system and by a third party authorized by the client system.

27. The system of claim 20 further comprising a document generation module wherein any one or combination of the following documents are created by the host server system using information contained in the case listing database; legal documents, action prompt reports, action prompt due date reports, client system defined forms, and client system defined letters.

28. The system of claim 27 wherein the documents are prepared automatically as a result of a time criteria.

29. The system of claim 27 wherein the time criteria is predefined by the client system in the host server system.

30. The system of claim 27 wherein the time criteria is a set date.

31. The system of claim 27 wherein the documents are generated in response to defined search parameters.

32. The system of claim 31 wherein the search parameters are selected from any one or combination of the following; case number, case file date, case government serial number, registration number, registration date, attorney in charge, case owner, case client, case domestic representative, case foreign representative, case plaintiff, case defendant, publication number, publication date, notice of allowance date, and case status.

33. The system of claim 27 wherein the documents are electronically forwarded to any one or combination of the following; the client system, a Governmental System, a third party designated by the client system.

34. The system of claim 27 wherein the documents are electronically forwarded to any one or combination of the following; the client system, a Governmental System, a third party designated by the client system.

35. The system of claim 20 wherein pattern data comprises of any one or combination of the following; a case filing date field, an official action mail date field, a case registration date field, a case appearance date field, a notice of allowance mail date field, a statement of acceptance date field, a publication date field, an entry of judgment date field, and a priority date field.

36. The system of claim 20 wherein the action prompt comprises of any one or combination of the following, action prompt to file a patent, action prompt to file a trademark, action prompt to file a response, action prompt to file an answer, action prompt to file a legal form, action prompt to submit a fee, action prompt to check status, action prompt to search for a document, action prompt to file an appeal, and action prompt to appear at a hearing, action prompt to file a motion.

37. The system of claim 20 wherein the time calculus comprises of any one or combination of the following; a formula for computing a date forward from a date, a formula for calculating a date backwards from a date.

38. The system of claim 20 wherein the client system identifier is any one or combination of the following, a user name, a password, an email address, a digital certificate, a digital signature, a personal identification code, membership numbers, an electronic "cookie", or any other alpha numeric character string that would identify the client system to the host server system.

39. A computer based method for on-line legal docketing using an electronic customizable client rules subset, said method comprising the steps of:

a. under control of a governmental system,
  i. sending a docket request message to a host server system identified by a first uniform resource locator, the host server system having a client case listing database containing legal case information from at least two client systems,
  ii. the docket request message further comprising pattern data and a pattern data date, b. under control of the host server system,
  i. receiving the docket request message,
  ii. identifying the governmental system using a third-party identifier,
  iii. identifying the legal case in the case listing database,
  iv. identifying the customizable client rules subset in a rule module database associated with the identified client system, wherein the host server system has a customizable client rule subset from at least two client systems
  v. using the pattern data contained in the docket request message submitted by the governmental system selecting at least one associated action prompt from the customizable client rules subset,
  vi. computing an action prompt due date for each of the associated action prompts using the pattern data date and a time calculus, and
  vii. recording the action prompt and computed action prompt due date for the legal case selected by the client system.

* * * * *